(12) United States Patent
Taylor et al.

(10) Patent No.: US 10,348,687 B2
(45) Date of Patent: Jul. 9, 2019

(54) METHOD AND APPARATUS FOR USING SOFTWARE DEFINED NETWORKING AND NETWORK FUNCTION VIRTUALIZATION TO SECURE RESIDENTIAL NETWORKS

(71) Applicant: Worcester Polytechnic Institute, Worcester, MA (US)

(72) Inventors: Curtis R. Taylor, Worcester, MA (US); Craig A. Shue, Worcester, MA (US)

(73) Assignee: WORCESTER POLYTECHNIC INSTITUTE, Worcester, MA (US)

( * ) Notice: Subject to any disclaimer, the term of this patent is extended or adjusted under 35 U.S.C. 154(b) by 172 days.

(21) Appl. No.: 15/381,712

(22) Filed: Dec. 16, 2016

(65) Prior Publication Data

US 2017/0180382 A1 Jun. 22, 2017

Related U.S. Application Data

(60) Provisional application No. 62/269,308, filed on Dec. 18, 2015.

(51) Int. Cl.
*H04L 29/06* (2006.01)
*H04L 12/28* (2006.01)

(52) U.S. Cl.
CPC ...... *H04L 63/0272* (2013.01); *H04L 12/2803* (2013.01); *H04L 63/0281* (2013.01); *H04L 63/101* (2013.01)

(58) Field of Classification Search
CPC ............... H04L 63/101; H04L 12/2803; H04L 63/0272; H04L 63/0281; H04L 63/029; H04L 63/00; H04L 63/02–63/0218; H04L 63/10; H04L 63/14; H04L 63/1441–63/1483; H04L 63/20–63/205; H04L 63/08
See application file for complete search history.

(56) References Cited

U.S. PATENT DOCUMENTS 8,693,374 B1    8/2014  Murphy et al.
2005/0193429 A1*  9/2005  Demopoulos ......... G06F 21/552
                                                    726/23

(Continued)

OTHER PUBLICATIONS

N. Feamster. Outsourcing home network security. In Proceedings of the 2010 ACM SIGCOMM Workshop on Home Networks, HomeNets '10, pp. 37-42, New York, NY, USA, 2010. ACM.

(Continued)

*Primary Examiner* — Kevin Bechtel
(74) *Attorney, Agent, or Firm* — Duquette Law Group, LLC

(57) ABSTRACT

A service provider device includes a controller having a memory and a processor. The controller is configured to receive a device access request from the client device via a residential network, the server provider device being located external to the residential network and detect a communication type identifier associated with the device access request. The controller is configured to establish a secure communication channel between the client device and a middlebox associated with the detected communication type identifier and provide communication between the client device and the server device via the secure communication channel between the client device.

18 Claims, 5 Drawing Sheets

(56) References Cited

U.S. PATENT DOCUMENTS

| | | | |
|---|---|---|---|
| 2012/0167185 A1* | 6/2012 | Menezes | H04L 9/3213 726/5 |
| 2013/0276082 A1* | 10/2013 | Kuang | H04L 63/0869 726/7 |
| 2014/0355436 A1 | 12/2014 | Zhang et al. | |
| 2016/0301779 A1* | 10/2016 | Cui | H04L 45/566 |
| 2016/0373414 A1* | 12/2016 | MacCarthaigh | H04L 63/0435 |

OTHER PUBLICATIONS

G. Gibb, H. Zeng, and N. McKeown. Outsourcing network functionality. In Proceedings of the First Workshop on Hot Topics in Software Defined Networks, pp. 73-78, 2012.

A. Matos, S. Sargento, and R. L. Aguiar. Waypoint routing: A network layer privacy framework. In Global Telecommunica-tions Conference (GLOBECOM 2011), 2011 IEEE, Dec. 2011.

S. Mehdi, J. Khalid, and S. Khayam. Revisiting traffic anomaly detection using software defined networking. In R. Sommer, D. Balzarotti, and G. Maier, editors, Recent Advances in Intrusion Detection, vol. 6961 of Lecture Notes in Computer Science, pp. 161-180. Springer Berlin Heidelberg, 2011.

R. Mortier, T. Rodden, P. Tolmie, T. Lodge, R. Spencer, A. crabtree, J. Sventek, and A. Koliousis. Homework: Putting interaction into the infrastructure. In ACM Symposium on User Interface Software and Technology, pp. 197-206, 2012.

J. Sherry, S. Hasan, C. Scott, A. Krishnamurthy, S. Ratnasamy, and V. Sekar. Making middleboxes someone else's problem: Network processing as a cloud service. In Proceedings of the ACM SIGCOMM 2012 Conference on Applications, Technologies, Architectures, and Protocols for Computer Communication, SIGCOMM '12, pp. 13-24, New York, NY, USA, 2012. ACM.

S. Sundaresan, S. Burnett, N. Feamster, and W. De Donato. Bismark: A testbed for deploying measurements and applications in broadband access networks. In Proceedings of the 2014 USENIX Conference on USENIX Annual Technical Conference, USENIX ATC'14, pp. 383-394, Berkeley, CA, USA, 2014. USENIX Association.

K. Xu, L. Gu, and F. Wang. Monitoring home network traffic via programmable routers. In Global Communications Conference (GLOBECOM), 2013 IEEE, pp. 605-610, Dec. 2013.

Y. Yiakoumis, S. Katti, T.-Y. Huang, N. McKeown, K.-K. Yap, and R. Johari. Putting home users in charge of their network. In Proceedings of the 2012 ACM Conference on Ubiquitous Computing, UbiComp '12, pp. 1114-1119, New York, NY, USA, 2012. ACM.

Y. Yiakoumis, K.-K. Yap, S. Katti, G. Parulkar, and N. McKeown. Slicing home networks. In Proceedings of the 2Nd ACM SIGCOMM Workshop on Home Networks, HomeNets '11, pp. 1-6, New York, NY, USA, 2011. ACM.

H. Kim and N. Feamster. Improving network management with software defined networking. Communications Magazine, IEEE, 51(2)114-119, 2013.

H. Kumar, H. H. Gharakheili, and V. Sivaraman. User control of quality of experience in home networks using sdn. In Advanced Networks and Telecommuncations Systems (ANTS), 2013 IEEE International Conference on, pp. 1-6. IEEE, 2013.

N. McKeown, T. Anderson, H. Balakrishnan, G. Parulkar, L. Peterson, J. Rexford, S. Shenker, and J. Turner. Openflow: enabling innovation in campus networks. ACM SIGCOMM Computer Communication Review, 38(2):69-74, 2008.

Z. Yuan, C. Du, X. Chen, D. Wang, and Y. Xue. Skytracer: Towards fine-grained identification for skype traffic via sequence signatures. In Computing, Networking and Communications (ICNC), 2014 International Conference on, pp. 1-5. IEEE, 2014.

* cited by examiner

METHOD AND APPARATUS FOR USING SOFTWARE DEFINED NETWORKING AND NETWORK FUNCTION VIRTUALIZATION TO SECURE RESIDENTIAL NETWORKS

RELATED APPLICATIONS

This patent application claims the benefit of U.S. Provisional Application No. 62/269,308, filed on Dec. 18, 2015, entitled, "Method and Apparatus for Using Software Defined Networking and Network Function Virtualization to Secure Residential Networks," the contents and teachings of which are hereby incorporated by reference in their entirety.

BACKGROUND

Computer networks allow users to access information stored within, or associated with, the network. A typical computer network can include multiple client computer devices that communicate with each other through a system of data communication devices (e.g., switches and routers) and transmission media (e.g., electrical wiring, fiber-optic cable, and/or wireless connections). In general, a transmitting client device exchanges data with a receiving client device by packaging the data using a standard format or protocol to form one or more data structures (e.g., packets, frames, or cells). The transmitting client device transfers these data structures to the receiving client device through the above-described network of computerized devices and transmission media.

Conventional computer networks, such as local area networks (LANs), can be subject to unwanted intrusion or attacks. For example, computerized devices on a network can be subject to user-level network attacks, such as drive-by-downloads (e.g., computer virus or malware) that can occur without a user's knowledge, such as when the user visits a particular website. Network computer devices can also be subject to other types of user-level network attacks, such as phishing attacks, which can obtain relatively sensitive information, such as passwords and user names, from the network computer devices.

SUMMARY

As provided above, conventional local area networks (LANs) can be subject to unwanted intrusion or attacks. Typically, relatively large enterprises and organizations invest in the security of their LAN networking infrastructures and resources to minimize the likelihood or success of such attacks. For example, organizations can utilize security tools, such as hardware firewalls, proxy servers, and intrusion detection systems, to strengthen their networks and minimize the risk of unwanted intrusion or attacks. These conventional solutions are relatively complex and require relatively larger budgets, and awareness of computer security to properly implement. Further, these organizations typically utilize a dedicated information technology (IT) staff with expertise in networking and security to administer the networks.

Conventional network security mechanisms are directed toward relatively large enterprises and organizations and do not address the needs of relatively smaller LANs, such as residential networks. For example, there are approximately 54 million residential LANs in the United States, which exceeds the number of LANs associated with the approximately 5.8 million U.S. corporations (i.e., enterprises and organizations). The average owner of a residential LAN will not necessarily have the expertise or budget to utilize network security solutions used by large organizations to limit or prevent network attacks.

Further, while residential-based network security solutions are available, these solutions can be fairly cumbersome to properly implement by the end user. For example, certain network security solutions require residential network owners to administer their networks and to make effective security decisions, despite a lack of training. Residential users often initially configure their networks and then neglect the infrastructure until it fails. This approach can result in residential networks that have relatively weak security which can yield sub-optimal results. Further, these network owners often neglect basic steps related to network security maintenance, such as changing default passwords or installing firmware updates to the security solutions. This provides an opportunity for adversaries to access the residential network. Additionally, residential network owners are at risk for incurring liability for the activity of inside users, such as guests, who use or share the network. For example, guests of a residential network can access illicit content over a connected wide area network without the knowledge of the network owner. In the case where the content is accessed illegally (e.g., an unlicensed download of copyrighted content), the network owner could be held liable for any legal infractions associated with the access.

By contrast to conventional network security solutions, embodiments of the present innovation relate to a method and apparatus for using software defined networking and network function virtualization to secure residential networks. In one arrangement, a service provider network system includes an offsite or cloud-based host, such as a service provider device, which is configured to establish a secure communication channel, such as virtual private network (VPN) connection, between a client device of a residential computer network and a cloud-based proxy device or middlebox. The secure communication channel is tailored to particular applications, workflows, or protocols executed by the computer devices within the residential network on a per-flow basis. That is, the middlebox is configured to monitor and control the network traffic associated with a particular application, workflow, or protocol as executed by the client device.

With such a configuration, the service provider device can secure all traffic exchanges with the residential computer network which allow residential network owners to outsource their network management to a security service provider. This offloads the responsibility of the security of the residential network from the network owner to the security service provider. Further, the service provider device operator can readily deploy new security measures and tools across a large number of residential networks, such as by updating or adding middleboxes to the service provider network system. The service provider device is further configured to direct network communication to a proxy device which, in turn, exchanges communication with targeted server devices over a wide area network, such as the Internet. With such a configuration, the service provider device can hide the network address of the residential network from the server device and other devices on the network, thereby minimizing the risk of the residential network devices as being subject to user-level network attacks.

Embodiments of the innovation relate to, in a service provider device, a method for providing communication between a client device and a server device. The method includes receiving, by the service provider device, a device access request from the client device via a residential network, the server provider device being located external to the residential network. The method includes detecting, by the service provider device, a communication type identifier associated with the device access request. The method includes establishing, by the service provider device, a secure communication channel between the client device and a middlebox associated with the detected communication type identifier. The method includes providing, by the service provider device, communication between the client device and the server device via the secure communication channel between the client device.

Embodiments of the innovation relate to a service provider device including a controller having a memory and a processor. The controller is configured to receive a device access request from the client device via a residential network, the server provider device being located external to the residential network and detect a communication type identifier associated with the device access request. The controller is configured to establish a secure communication channel between the client device and a middlebox associated with the detected communication type identifier and provide communication between the client device and the server device via the secure communication channel between the client device and the middlebox.

BRIEF DESCRIPTION OF THE DRAWINGS

The foregoing and other objects, features and advantages will be apparent from the following description of particular embodiments of the innovation, as illustrated in the accompanying drawings in which like reference characters refer to the same parts throughout the different views. The drawings are not necessarily to scale, emphasis instead being placed upon illustrating the principles of various embodiments of the innovation.

DETAILED DESCRIPTION

Embodiments of the present innovation relate to a method and apparatus for using software defined networking and network function virtualization to secure residential networks. In one arrangement, a service provider network system includes an offsite or cloud-based host, such as a service provider device, which is configured to establish a secure communication channel, such as virtual private network (VPN) connection, between a client device of a residential computer network and a cloud-based proxy device or middlebox. The secure communication channel is tailored to particular applications, workflows, or protocols executed by the computer devices within the residential network on a per-flow basis. That is, the middlebox is configured to monitor and control the network traffic associated with a particular application, workflow, or protocol as executed by the client device.

With such a configuration, the service provider device can secure all traffic exchanges with the residential computer network which allow residential network owners to outsource their network management to a security service provider. This offloads the responsibility of the security of the residential network from the network owner to the security service provider. Further, the service provider device operator can readily deploy new security measures and tools across a large number of residential networks, such as by updating or adding middleboxes to the service provider network system. The service provider device is further configured to direct network communication to a proxy device which, in turn, exchanges communication with targeted server devices over a wide area network, such as the Internet. With such a configuration, the service provider device can hide the network address of the residential network from the server device and other devices on the network, thereby minimizing the risk of the residential network devices as being subject to user-level network attacks.

Figure 1:
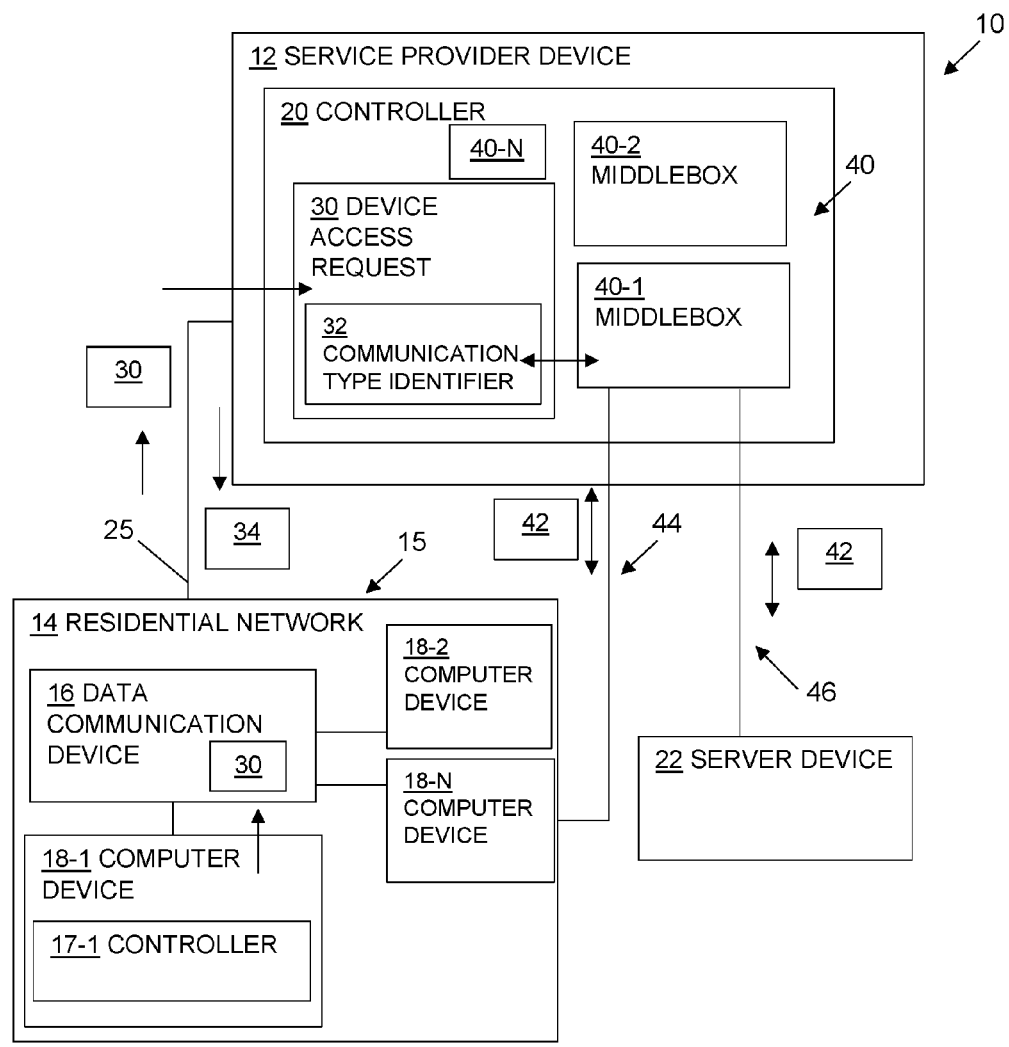
FIG. 1 illustrates a schematic representation of a service provider network system, according to one arrangement.

FIG. 1 illustrates a schematic representation of a service provider network system 10, according to one arrangement. The service provider network system 10 can form part of a wide area network (WAN), such as the Internet, and can include multiple network resources. For example, the service provider network system 10 can include a local area network (LAN), such as a residential network 14 having client devices 15 and a service provider device 12 having associated cloud-based proxy devices or middleboxes 40.

As illustrated, the residential network 14 can include, as client devices 15, a data communication device 16. In one arrangement, the data communication device 16, such as a computerized device, switch, router, or gateway. The data communication device 16 is configured to exchange network connection communication, such as Transmission Control Protocol/Internet Protocol (TCP/IP) communication, between the residential network 14 and the service provider device 12. For example, a controller (not shown) of the data communication device 16 can be configured with OpenWrt firmware having an Open vSwitch module enabled to support the OpenFlow protocol. As such, upon boot-up, the data communication device 16 can establish a network connection with the service provider device 12 and can request instruction for all new communication channel requests or network flows, such as requested by the computer devices 18 of the residential network 14. As a result, during operation, the data communication device 16 is configured to forward network communication from the computer devices 18 of the residential network 14 to a proxy device as directed by the service provider device 12, rather than to a target server device 22.

Also as illustrated, the residential network 14 can include, as client devices 15, one or more computer devices 18-1 through 18-N disposed in electrical communication with the data communication device 16. In one arrangement, each one or more of the computer devices 18 can be configured as a laptop, tablet device, or personal computer having a controller 17, such as a memory and a processor. Alternately, one or more of the computer devices 18 can be configured as a network connected device, such as a printer device photocopy device. Further, one or more of the computer devices 18 can be configured as an embedded device, such as a networked light switch having an associated controller 17. During operation, the computer devices 18 are configured to exchange network communication with the server device 22 via the data communication device 16 and a proxy device as directed by the service provider device 12.

The service provider device 12 is a computerized device disposed in electrical communication with a client device 15 of the residential network 14, such as the data communication device 16. The service provider device 12 is located external to, or offsite from, the residential network 14. For example, the service provider device 12 can be configured as part of an offsite, cloud-based service.

In one arrangement, the service provider device 12 is configured to direct the behavior of the data communication device 16 and control distribution of communication between the residential network 14 and a variety of server devices 22 located on the WAN. For example, the service provider device 12 includes a controller 20, such as a memory and a processor, that executes a connection review protocol, such as an OpenFlow protocol, which is configured to receive and review device access requests 30 (e.g., network connection requests) received from the data communication device 16.

Also as indicated, the service provider device 12 includes one or more associated middleboxes 40, such as middleboxes 40-1 through 40-N. In one arrangement, each middlebox 40 is configured to act as a proxy device for network traffic associated with a particular application, workflow, or protocol executed by the computer devices 18 within the residential network 14 on a per-flow or per-access basis. For example, the first middlebox 40-1 can be configured to proxy and monitor network traffic pertaining to a particular type of video conferencing (e.g., SKYPE) while the second middlebox 40-2 can be configured to proxy and monitor network traffic pertaining to a particular type motion picture streaming (e.g., NETFLIX). With each middlebox 40 being configured to proxy and monitor a particular application, workflow, or protocol, the service provider device 12 can secure any number of applications executed by the client devices 15 across many types of residential networks 14, regardless of the security concerns or goals.

The middleboxes 40 can be configured in a variety of ways. In one arrangement, each middlebox 40 is configured as a virtual machine executed by the controller 20 of the service provider device 12, such as illustrated. Alternately, each middlebox 40 is configured as a computerized device disposed in electrical communication with the server provider device 12.

During operation, the service provider device 12 is configured to establish a secure communication channel, such as a virtual private network (VPN), with a client device 15 of a residential network 14 and to direct communication between the client device 15 and a server device 22. The following provides a description of an example operation of the service provider device 12 when establishing communication channels and providing such communication.

With continued reference to FIG. 1, the service provider device 12 is configured to receive a device access request 30 from a client device 15 of a residential network 14. For example, assume the case where a user of a first computer device 18-1 seeks to establish a video conferencing connection (e.g., SKYPE) with server device 22. In such a case, the computer device 18-1 generates a device access request 30 identifying the server device 22 and forwards the request within the residential network 14 to the data communication device 16. While the device access request 30 can be configured in a number of ways, in one arrangement, the device access request 30 is configured as a synchronize (SYN) message as part of a TCP/IP handshake. Upon receipt, based upon the configuration of the data communication device 16 (e.g., as configured with the OpenFlow firmware), the data communication device 16 forwards the device access request 30 to the service provider device 12 via network communication channel 25 (e.g., over a WAN such as the Internet), rather than to the server device 22 identified by the device access request 30.

In response to receiving the device access request 30, the service provider device 12 is configured to detect a communication type identifier 32 associated with the device access request 30. The communication type identifier 32 relates to a particular application, workflow, or protocol to be executed by the computer device 18. For example, the communication type identifier 32 can indicate a request to access a server device 22 which offers a particular service, such as SKYPE, or motion picture streaming content, such as NETFLIX. By detecting the communication type identifier 32 associated with the device access request 30, the service provider device 12 can identify the particular application, workflow, or protocol associated with the network traffic from the requesting computer device 18.

Based upon the detected communication type identifier 32, the service provider device 12 can select an appropriate, associated middlebox 40 configured to proxy and monitor the application, workflow, or protocol traffic from the client device 15. For example, assume the service provider device 12 detects the communication type identifier 32 associated with the device access request 30 as pertaining to a particular type of video conferencing (e.g., SKYPE). Based upon such detection, the service provider device 12 can select the first middlebox 40-1, which is configured to proxy and monitor network traffic pertaining to the particular type of video conferencing (e.g., SKYPE), as the middlebox 40 to proxy and monitor network traffic between the computer device 18, via the data communication device 16, and the server device 22.

Following detection of the communication type identifier 32 associated with the device access request 30, the service provider device 12 is configured to establish a secure communication channel 44 between the client device 15 and a middlebox 40 associated with the detected communication type identifier 32. For example, following selection of the first middlebox 40-1 as the network communication proxy, the service provider device 12 is configured to transmit a communication channel instruction 34 to the data communication device 16, such as by using the OpenFlow protocol. The communication channel instruction 34 can direct the data communication device 16 to establish a secure communication channel 44 between the data communication device 16 and the selected first middlebox 40-1 associated with the communication type identifier 32. In response to the communication channel instruction 34, the data communication device 16 can establish dynamically spawned virtual private network (VPN) or a Generic Routing Encapsulation (GRE) tunnel as the secure communication channel 44 with the first middlebox 40-1.

Next, the service provider device 12 is configured to provide communication 42 between the client device 15 and the server device 22 via the secure communication channel 44 between the client device 15 and the middlebox 40. For example, based upon the establishment of the secure communication channel 44 with the first middlebox 40-1 the data communication device 16 is configured to transmit network communication 42 to the first middlebox 40-1. As the first middlebox 40-1 receives the network communication 42 from the data communication device 16 via the secured communication channel 44, the first middlebox 40-1 performs a network address translation (NAT) on the communication 42 and forwards the communication 42 to the target destination server device 22 via a communication channel 46. Further as the first middlebox 40-1 receives network communication 42 from the server device 22 via the communication channel 46, the first middlebox 40-1 performs a NAT on the communication 42 and forwards the communication 42 to the data communication device 16 via secured communication channel 44.

Accordingly, the service provider device 12 is configured to offload the responsibility of the security of the residential network 14 from the network owner to an offsite security service provider. For example, by establishing a secured communication channel 44 for network communication between a data communications device and a middlebox 40 and by utilizing the middlebox 40 to act as a proxy device relative to a server device 22, the service provider device 12 can hide the network address of the client devices 15 residential network 14 from the server device 22 and other devices on the wide area network (e.g., Internet). This protects the residential network 14 by hiding the Internet protocol (IP) address of the computer devices 18 on the residential network 14 and minimizes the risk of the residential network devices 15 as being subject to user-level network attacks.

Further, by securing network communication between the client devices 15 of the residential network 14 and the server device 22, the service provider device 12 allows residential network owners to outsource their network management to a security service provider via an offsite or cloud-based service. This offloads the responsibility of the security of the residential network 14 from the network owner to the security service provider, rather than requiring residential network owners to become experts in network security.

Additionally, the service provider device 12 is located external to, or offsite from, the residential network 14. For example, the service provider device 12 can be configured as part of an offsite, cloud-based service. With such a configuration, a service provider device operator can deploy updated security measures and security tools across a relatively large number of residential networks 14 in a relatively cost effective manner, without requiring a physical presence in the associated residences. This minimizes the need to the residential network owner to either monitor his own residential network 14 or to utilize relatively costly network security solutions to limit or prevent network attacks.

As indicated above, during operation, the service provider device 12 is configured identify a communication type identifier 32 of a device access request 30. This allows the service provider device 12 to detect the particular application, workflow, or protocol associated with a network connection originating from the requesting client device 15 before the connection is established. Further, this allows the service provider device 12 to select an appropriate middlebox 40 configured to proxy and monitor the network traffic associated with that application, workflow, or protocol on a per-flow or per-access request basis. The service provider device 12 can be configured to identify the communication type identifier 32 associated with a device access request 30 in a variety of ways.

Figure 2:
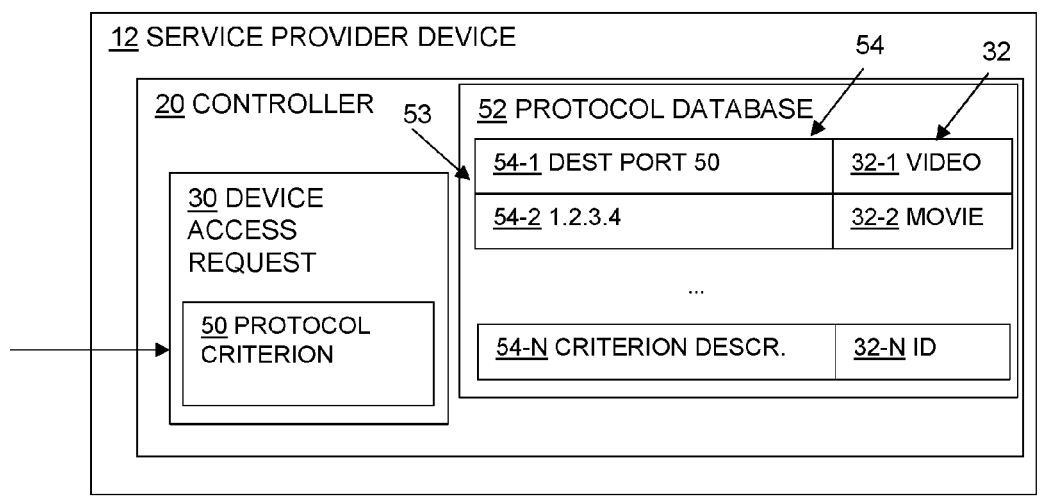
FIG. 2 illustrates a schematic representation of a service provider device having a protocol database, according to one arrangement.

In one arrangement, with reference to FIG. 2, when identifying a communication type identifier 32, the service provider device 12 is configured to first detect a protocol criterion 50 associated with the device access request 30. The protocol criterion 50 can be configured to identify some aspect of the application, workflow, or protocol associated with a network connection between the client device 15 and the server device 22. For example, certain network communication associated with a particular application can originate from a particular port, while other network communication associated with a particular protocol can have a particular destination IP address. In such a case, the device access request 30 includes, as the protocol criterion 50, an originating port number or a destination IP address associated with the device request 30. When detecting the protocol criterion 50, the service provider device 12 can extract the protocol criterion 50 from the payload the device access request 30.

Once the service provider device 12 has detected the protocol configuration 50 associated with the device access request 30, the service provider device 12 is configured to compare the protocol criterion 50 with a protocol database 52. In one arrangement, the service provider device 12 can store a preconfigured protocol database 52 which includes entries 53 that relate protocol criterion descriptions 54 to corresponding communication type identifiers 32. For example, a first protocol description 54-1, "destination port 50," corresponds to a first communication type identifier, "video conference service" while a second protocol description 54-2, IP address "1.2.3.4" corresponds to "motion picture streaming service." Accordingly, in use, the service provider device 12 is configured to compare the protocol criterion 50 with each entry 53 of the protocol database 52 to attempt to identify a particular application, workflow, or protocol associated with the device access request 30 before establishing the network connection.

The service provider device 12 is then configured to detect the communication type identifier 32 associated with the device access request 30 based upon a correspondence of the protocol criterion 50 and an entry 53 in the protocol database 52. For example, assume the case where the protocol criterion 50 identifies "destination port 50" as the port of the destination server device 22 with which the data communication device 16 is attempting to establish a connection. Based upon a comparison of the protocol criterion 50 with the entries 53 of the protocol database 52, the service provider device 12 can identify a correspondence between the protocol criterion 50 and the first protocol description 54-1. Based upon such a correspondence, the service provider device 12 can identify corresponding communication type identifier 32, as a video conference service (e.g., SKYPE). By detecting the communication type identifier 32 in this manner, the service provider device 12 can select an appropriate middlebox 40 associated with the video conference service to proxy and monitor the network communication between the data communication device 16 and the server device 22 (i.e., a SKYPE server device).

In the case where the service provider device 12 detects a lack of correspondence between the protocol criterion 50 and the entries 53 of the protocol database 52, in one arrangement, the service provider device 12 can identify the device access request 30 as indicating a security threat and can drop the device access request 30. As such, the service provider device 12 will not establish a network connection between the requesting client device 15 and the server device 22.

Figure 4:
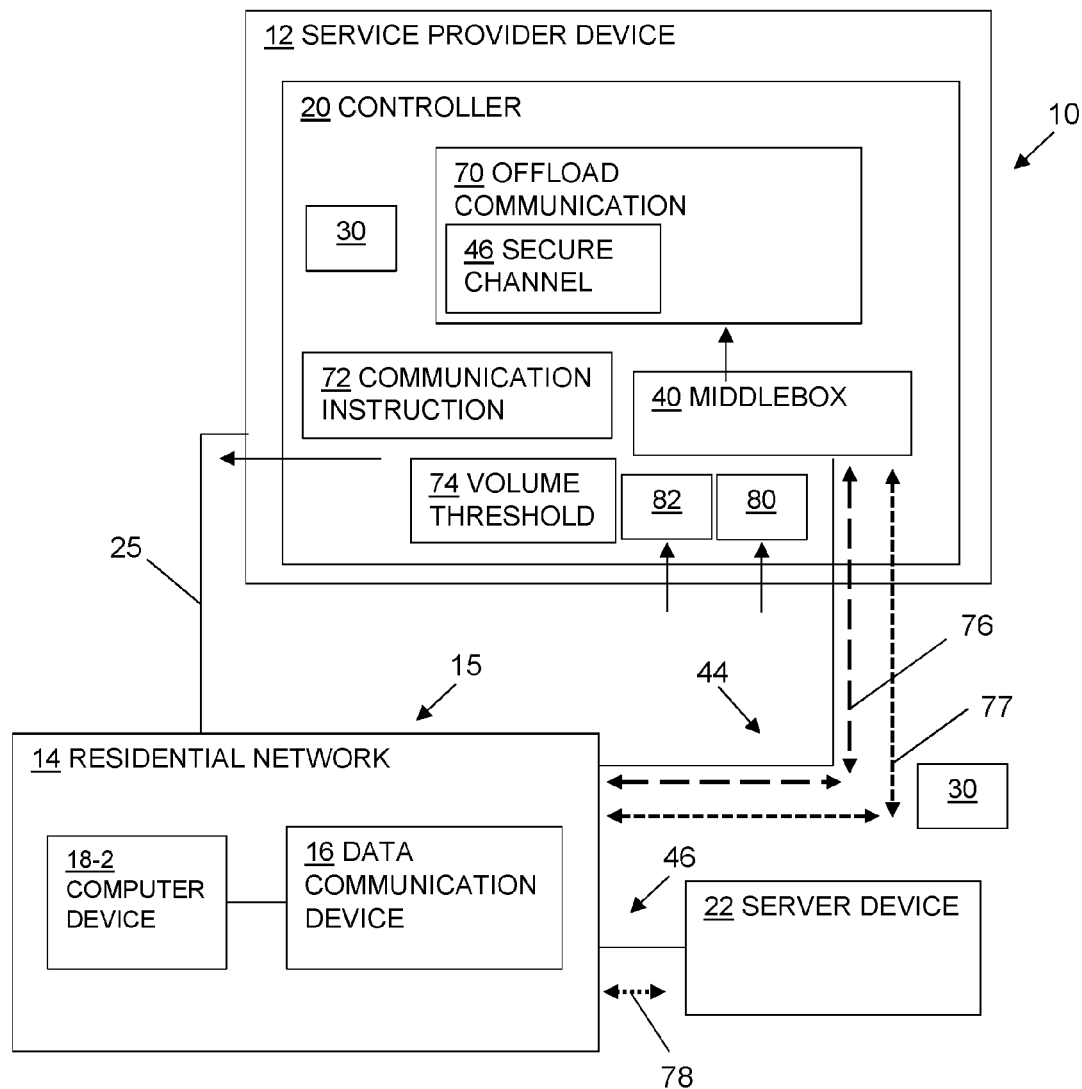
FIG. 4 illustrates a schematic representation of a service provider network system, according to one arrangement.

In another arrangement, with reference to FIG. 4, when identifying a communication type identifier 32, the service provider device 12 is configured to utilize a local domain name server (DNS) database 62. As illustrated, the service provider device 12 can store the DNS database 62 which includes entries 63 that relate numerical Internet protocol (IP) addresses 64 to corresponding domain or website address names 66. For example, as provided in the DNS database 62, a first IP address "2.4.6.8" 64-1 corresponds to a first domain name "www.video-conference.com," 66-1 while a second IP address "11.12.13.14" 66-2 relates to a second domain name "www.movie-stream.com," 66-2. Accordingly, in use, the service provider device 12 is configured to compare the protocol criterion 50 with each entry 53 of the protocol database 52 to attempt to identify a particular application, workflow, or protocol associated with the device access request 30 before establishing the network connection.

The service provider device 12 is configured to develop the DNS database 62 based upon DNS request resolution performed by client devices 15 of the residential networks 14. For example, when a client device 15 of the residential network 14 attempts to establish a network connection with a server device 22 via a domain name (e.g., www.name.com), the computer device 18 forwards a DNS request to a domain name server. In response to the DNS request, the domain name server returns a DNS response, such as a numerical IP address (e.g., 20.21.22.23) corresponding to the domain name, to the computer device 18. Each time a client devices 15 initiates a DNS request, the data communication 16 is configured, such as via the OpenFlow protocol, to forward a copy of the DNS response to the service provider device 12. The service provider device 12 then parses the DNS response to identify responses associated with known server device domain names. If the service provider device 12 detects such a response, the service provider device 12 extracts the IP addresses contained within the response and adds each numerical Internet protocol (IP) address 64 and the corresponding domain or website address name 66 to the local DNS database 62.

Figure 3:
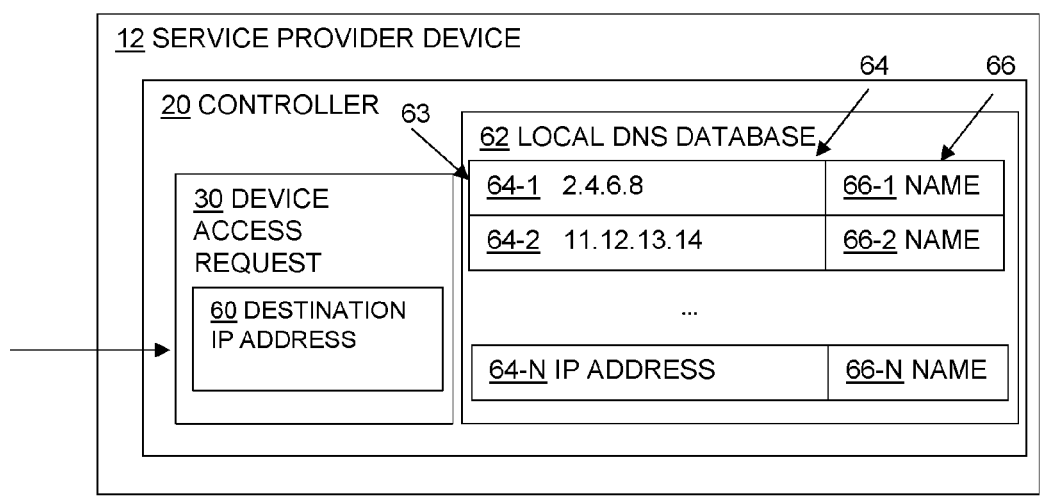
FIG. 3 illustrates a schematic representation of a service provider device having a local domain name server database, according to one arrangement.

In use, and with continued reference to FIG. 3, when the data communication device 16 transmits the device access request 30 to the service provider device 12, the device access request 30 includes a destination IP address 60, such as associated with a particular server device 22 to which the data communication device 16 would like to establish a network connection. In response, the service provider device 12 can extract the destination IP address 60 from the payload the device access request 30.

The service provider device 12 is configured to then compare the destination IP address 60 with the local DNS database 62. For example, assume the case where the destination IP address 60 identifies the IP address 11.12.13.14. Based upon a comparison with the entries 63 of the local DNS database 62, the service provider device 12 can identify the IP address entry "11.12.13.14" 64-2 as corresponding to the destination IP address 60 and can identify the domain name "www.movie-stream.com" 66-2 corresponding to the IP address entry.

The service provider device 12 is configured to then detect the communication type identifier 32 associated with the device access request 60 based upon a correspondence of the destination IP address 60 and an entry 63 in the local DNS database 62. For example, based upon the correspondence of the destination IP address 60 with the domain name "www.movie-stream.com" 66-2, as provided above, the service provider device 12 can identify corresponding communication type identifier 32 as a motion picture streaming service (e.g., NETFLIX). By detecting the communication type identifier 32 in this manner, the service provider device 12 can select an appropriate middlebox 40 associated with the motion picture streaming service to proxy and monitor the network communication between the data communication device 16 and the server device 22 (i.e., a NETFLIX server device).

In the case where the service provider device 12 detects a lack of correspondence between the destination IP address 60 and the entries 63 of the local DNS database 62, in one arrangement, the service provider device 12 can identify the device access request 30 as indicating a security threat and can drop the device access request 30. As such, the service provider device 12 will not establish a network connection between the requesting client device 15 and the server device 22.

Returning to FIG. 1, and as provided above, following the establishment of the secure network connection 44 by the service provider device, the middlebox 40 forms part of the communication path between a client device 15 and a server device 22. However, in certain cases, the middlebox 40 can introduce relatively large amounts of latency to the communication exchanged between the data communication device 16 and the server device 22. For certain types of content, such as motion picture streaming or on-line video games, the latency can be unacceptable to the end user. In certain cases, to minimize the effect of the middlebox 40 in the exchange of content between the data communication device 16 and the server device 22, the middlebox 40 is configured to detect an offload condition associated with the communication between the client device 15 and the server device 22. In the case where an offload condition is detected, the middlebox 40 is configured to generate and transmit an offload communication 70 to the service provider device 12 to request that the service provider device 12 exclude the middlebox 40 from the communication path between the client device 15 and the server device 22.

As provided above, the middlebox 40 is configured as a proxy device and is included as part of the network communication exchanged between a client device 15 and a server device 22. In one arrangement, the middlebox 40 is configured as a monitoring device. While the middlebox 40 can monitor network traffic to maintain the security of the residential network 14, the middlebox 40 is also configured to detect a state of the connection or network communication exchanged between the client device 15 and the server device 22. Based on the state of the connection or the network communication (i.e., an offload condition), the middlebox 40 can exclude itself from the communication exchanged between the client device 15 and the server device 22.

In one arrangement, as part of such a monitoring configuration and with reference to FIG. 4, the middlebox 40 can detect the establishment of a secure channel, such as an encrypted channel, between the client device 15 and the server device 22 as an offload condition.

For example, certain services or server devices 22 typically provide streaming content, such as video content (e.g., online streaming motion pictures), to subscribing client devices 15 over secure network or communication channels. The communication channels are established by the server devices 22 as secure communication channels in order to minimize illicit interception and/or redirection of the content stream to non-subscribing devices. With the presence of a secure network channel established by the server devices 22, the use of the middlebox 40 as a monitoring device is not necessary. Accordingly, by detecting the presence of a secure network channel between the server device 22 and client device 15, the middlebox 40 can remove itself from the communication between the server device 22 and client device 15 while maintaining a level of security associated with the residential network 14.

For example, during the establishment of the secure communication channel, the device access request 30 provided by the data communication device 16 to the service provider device 12 via network communication channel 25 is configured as a synchronize (SYN) message 30. This forms part of a handshaking process of a Transport Layer Security (TLS) connection. During operation, when the data communication device 16 transmits such a device access request 30 to the service provider device 12, the service provider device 12 directs the data communication device to forward the device access request 30 to a selected middlebox 40 (e.g., a middlebox 40 associated with a particular application, workflow, or protocol executed by the computer devices 18).

In response, the data communication device 16 forwards the request to the middlebox 40 via communication channel 44 (e.g., secure communication channel 44), such as along path 76. The middlebox 40 reviews the device access request 30, can identify the request 30 as a SYN message or packet, and can return the request 30 to the data communication device 16, such as along path 77. Upon receipt of the request 30, the data communication device 16 forwards the SYN packet 30 to the server device 22, such as along path 78.

The middlebox 40 is further configured to receive and review acknowledge (ACK) messages transmitted from both the server device 22 to the data communication device 16 and from the data communication device 16 to the server device 22. For example, in response to the SYN packet 30, the server device 22 transmits an ACK packet to the data communication device 16, such as along path 78. The data communication device 16 receives the ACK packet and transmits the ACK packet to the middlebox 40, such as along path 77, for verification. Once returned from the middlebox 40, the data communication device 16 then generates its own acknowledgement packet, transmits it to the middlebox 40, and awaits verification from the middlebox 40 before forwarding to the server device 22. In the case where the middlebox 40 identifies these messages as acknowledgement messages, the middlebox 40 can recognize the communication exchange between the data communication device 16 and the server device 22 as forming a secure communication channel or TLS connection between the middlebox 40 and the server device 22.

In one arrangement, the middlebox 40 is further configured to validate the TLS connection between the client device 15 and the server device 22 to identify potential security threats to the residential network 14 originating from the server device 22.

For example, following the handshaking process, as part of the ACK messages transmitted from the data communication device 16 and the server device 22, the middlebox 40 can receive a Server Hello message from the server device 22 which includes a chain of security certificates 80. Once received, the middlebox 40 is configured to extract the security certificates 80 from the Server Hello message, including a root certificate. The middlebox 40 can then utilize its own database of trusted root certificates to verify the authenticity of each of the certificates 80 in the chain. In the case where the middlebox 40 detects a failure of the verification process at any point in the chain, the middlebox 40 is configured to break the connection with the server device 22. In the case where the middlebox 40 detects the certificates 80 as being valid, the middlebox 40 can validate the TLS connection between the client device 15 and the server device 22. By validating the certificates 80 received as part of the Server Hello message, the middlebox 40 the service provider device 12 can identify potential security threats to the residential network 14 originating from the server device 22.

In one arrangement, as part of the TLS connection validation, the middlebox 40 is configured to detect revocation of the certificates 80 included with the Server Hello message. For example, for each certificate 80 associated with the Server Hello message identifies an associated certificate revocation list (CRL). During operation, the middlebox 40 is configured to iteratively check for revocation of each certificate 80 using each certificate's indicated CRL. For example, the middlebox 40 is configured iteratively retrieve each CRL for each certificate in the chain. In the case where the middlebox 40 successfully retrieves the CRLs, the middlebox 40 is configured to perform a full-chain CRL check, such as by utilizing LibreSSL.

As a result of validating of the TLS connection and handshaking, the middlebox 40 is configured to generate and forward an offload communication 70 to the service provider device 12. In response to receiving the offload communication 70 which identifies the secure communication channel 46 between the middlebox 40 and the server device 22, the service provider device 12 is configured to transmit a communication instruction 72 to the client device 15. The communication instruction 72 is configured to direct the client device 15 to exchange communication with the server device 22. For example, the communication instruction 72 can include the IP address of the server device 22 and instructions for the data communication device 16 to exchange network communication with the server device 22 rather than with the selected middlebox 40. By identifying the presence of a secure communication channel with the server device, the middlebox 40 can remove itself from the communications path while maintaining a level of security with respect to the residential network 14.

In another arrangement, the middlebox 40 can identify, as an offload condition, a volume of communication exchanged between the data communication device 16 and the server device 22 as meeting a communication volume threshold 74.

For example, certain services or server devices 22 typically provide streaming content, such as video content (e.g., online streaming motion pictures), to subscribing client devices 15 over secure network or communication channels. For certain types of content, such as motion picture streaming or on-line video games, the presence of the middlebox 40 in the communication channel between the client device 15 and server device 22 can add unacceptable latency to the communication.

In use, the middlebox 40 is configured to detect a volume of communication 82 transmitted between a client device 15 and the server device 22 and can compare the volume to a communication volume threshold 74. For example, assume the volume of communication 82 is at a rate of 100 packets per second. In the case where the middlebox 40 identifies the volume of communication 82 as meeting the communication volume threshold 74 (e.g., the communication volume threshold 74 is equal to a rate of 100 packets per second), the middlebox 40 is configured to transmit the offload communication 70 to the service provider device 12.

In response to receiving the offload communication 70 which identifies the volume of communication 82 as meeting the communication volume threshold 74, the service provider device 12 is configured to transmit a communication instruction 72 to the client device 15. The communication instruction 72 is configured to establish a communication channel between the client device 15 and the server device 22, as provided above. By identifying the communication volume between the client device 15 and the server device 22 as meeting a communication volume threshold 72, the middlebox 40 can remove itself from the communications path to minimize communication latency.

As provided above, the middlebox 40 is configured to transmit the offload communication 70 to the service provider device 12 in response to either identifying a secure communication channel 46 between the middlebox 40 and the server device 22 or identifying a volume of communication exchanged between the data communication device 16 and the server device 22 as meeting a communication volume threshold 74. In one arrangement, the middlebox 40 is configured to transmit the offload communication 70 to the service provider device 12 in response to identifying both a secure communication channel 46 between the middlebox 40 and the server device 22 and a volume of communication exchanged between the data communication device 16 and the server device 22 as meeting a communication volume threshold 74.

As provided above, one or more of the client devices 15 of the residential network 14 can be configured as an embedded device, such as a networked light switch. While these embedded devices typically provide a limited number of commands within the residential network 14 (e.g., "turn on," "turn off"), the embedded devices can be subject to user-level network attacks. For example, the embedded devices can be configured to engage in a denial-of-service attach on a server device 20 over the WAN without the knowledge or detection by the residential network operator.

Figure 5:
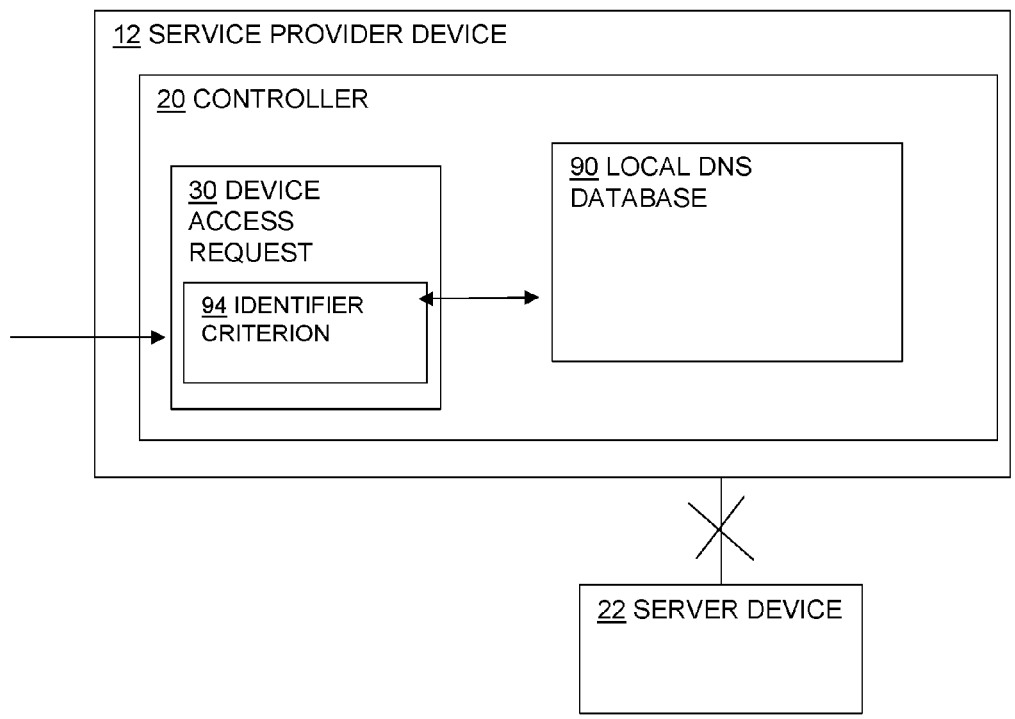
FIG. 5 illustrates a schematic representation of a service provider device having a whitelist database, according to one arrangement.

In one arrangement, with reference to FIG. 5, the service provider device 12 is configured to develop a whitelist or exclusions database 90 that, over time, can identify various client device identifier criteria associated with the embedded devices of the residential network 14. For example, when an embedded device 18-2 of the residential network 14 transmits a command ("turn on," "turn off") to the data communication device 16, the data communication device 16 forwards the command as well as information relating to the embedded device 18-2 (e.g., manufacturer, MAC address, etc.) to the service provider device 12 as a client device identifier 92. In response, the service provider device 12 adds the client device identifier 92 to the whitelist database 90. As such, the service provider device 12 is configured to learn about the types of embedded device messages it receives over time.

In use, as the service provider device 12 receives device access requests 30 from the data communication device, the service provider device 12 is configured to determine if the source of the device access requests 30 is a compromised embedded device 18-2. For example, the service provider device 12 can utilize the whitelist database 90 base upon a client device identifier criterion 94 associated with the device access request 30.

For example, assume the case where the embedded device 18-2 generates a command ("turn on," "turn off") and forwards the command to the data communication device 16. The data communication device 16 can forward the command to the service provider device 12 as a client device identifier criterion 94 (i.e., as part of a device access requests 30).

In one arrangement, when the service provider device 12 receives the device access requests 30, the service provider device 12 is configured to compare the client device identifier criterion 94 with the whitelist database 90. In response to detecting a lack of correspondence between the client device identifier criterion 94 and an entry in the whitelist database 90, the service provider device 12 is configured deny any communication between the embedded device 18-2 and the server device 22. In another arrangement, based upon the client device identifier criterion 94, the service provider device 12 can identify a manufacturer of the embedded device, such as by using MAC address, to identify specific messages are allowed, or that should be denied, for that device.

In one arrangement, the service provider device 12 is further configured to detect a rate of messages generated by the embedded device within the residential network 14. For example, assume the case where the service provider device 12 detects that a number of messages (e.g., "turn off") generated by the embedded device over a given time interval meets a threshold. In such a case, the service provider device 12 can perform a rate limiting function, such as by directing the embedded to stop sending the messages. As such, the service provider device 12 limits excessive amount of control traffic within the residential network 14.

While various embodiments of the innovation have been particularly shown and described, it will be understood by those skilled in the art that various changes in form and details may be made therein without departing from the spirit and scope of the innovation as defined by the appended claims.

What is claimed is:

1. In a service provider device, a method for providing communication between a client device and a server device, comprising:

receiving, by the service provider device, a device access request from the client device via a residential network, the request addressed to an address of the server device, the service provider device being located external to the residential network;

determining, by the service provider device, one of a protocol criterion associated with the device access request and a destination Internet protocol address corresponding to the address of the server device associated with the device access request;

determining, by the service provider device, a communication type identifier associated with the device access request based on a comparison of an entry in a database and one of the protocol criterion and the destination Internet protocol address corresponding to the address of the server device;

selecting, by the service provider device, a middlebox from a plurality of middleboxes, the selecting based on the associated determined communication type identifier;

establishing, by the service provider device, a secure communication channel between the client device and the middlebox associated with the determined communication type identifier; and providing, by the service provider device, communication between the client device and the server device via the secure communication channel between the client device and the middlebox.

2. The method of claim 1, wherein determining the communication type identifier associated with the device access request based on the comparison of the entry in the database and the protocol criterion comprises:

comparing, by the service provider device, the protocol criterion with a protocol database; and determining, by the service provider device, the communication type identifier associated with the device access request based upon a correspondence of the protocol criterion and an entry in the protocol database.

3. The method of claim 1, wherein determining the communication type identifier associated with the device access request based on the comparison of the entry in the database and the destination Internet protocol address corresponding to the address of the server device comprises:
  comparing, by the service provider device, the destination Internet protocol address with a local domain name server database, the local domain name server database including Internet protocol addresses and corresponding domain names; and
  determining, by the service provider device, the communication type identifier associated with the device access request based upon a correspondence of the destination Internet protocol address and an entry in the local domain name server database.

4. The method of claim 1, further comprising:
  receiving, by the service provider device, an offload communication from the middlebox identifying a secure communication channel between the client device and the server device; and
  in response to receiving the offload communication, forwarding, by the service provider device, a communication instruction to the client device, the communication instruction configured to direct the client device to exchange communication with the server device.

5. The method of claim 4, wherein receiving the offload communication from the middlebox identifying a secure communication channel between the client device and the server device comprises receiving, by the service provider device, an offload communication from the middlebox identifying the establishment of a Transport Layer Security (TLS) connection between the client device and the server device.

6. The method of claim 5, further comprising validating, by the service provider device, the TLS connection between the client device and the server device.

7. The method of claim 1, further comprising:
  receiving, by the service provider device, an offload communication from the middlebox identifying communication between the client device and the server device as meeting a communication volume threshold; and
  in response to receiving the offload communication, forwarding, by the service provider device, a communication instruction to the client device, the communication instruction configured to direct the client device to exchange communication with the server device.

8. The method of claim 1, further comprising:
  receiving, by the service provider device, an offload communication from the middlebox identifying a secure communication channel between the client device and the server device and identifying communication between the client device and the server device as meeting a communication volume threshold; and
  in response to receiving the offload communication, forwarding, by the service provider device, a communication instruction to the client device, the communication instruction configured to direct the client device to exchange communication with the server device.

9. The method of claim 1, comprising:
  detecting, by the service provider device, a client device identifier criterion associated with the device access request;
  comparing, by the service provider device, the client device identifier criterion with a whitelist database; and
  in response to detecting a lack of correspondence between the client device identifier criterion and an entry in the whitelist database, denying, by the service provider device, communication between the client device and the server device.

10. A service provider device, comprising:
  a controller having a memory and a processor, the controller configured to:
  receive a device access request from the client device via a residential network, the request addressed to an address of the server device, the service provider device being located external to the residential network;
  determine one of a protocol criterion associated with the device access request and a destination Internet protocol address corresponding to the address of the server device associated with the device access request;
  determine a communication type identifier associated with the device access request based on a comparison of an entry in a database and one of the protocol criterion and the destination Internet protocol address corresponding to the address of the server device;
  select a middlebox from a plurality of middleboxes, the selecting based on the associated determined communication type identifier;
  establish a secure communication channel between the client device and the middlebox associated with the determined communication type identifier; and
  provide communication between the client device and the server device via the secure communication channel between the client device and the middlebox.

11. The service provider device of claim 10, wherein when determining the communication type identifier associated with the device access request based on the comparison of the entry in the database and the protocol criterion, the controller is configured to:
  compare the protocol criterion with a protocol database; and
  determine the communication type identifier associated with the device access request based upon a correspondence of the protocol criterion and an entry in the protocol database.

12. The service provider device of claim 10, wherein when determining the communication type identifier associated with the device access request based on the comparison of the entry in the database and the destination Internet protocol address corresponding to the address of the server device, the controller is configured to:
  compare the destination Internet protocol address with a local domain name server database, the local domain name server database including Internet protocol addresses and corresponding domain names; and
  determine the communication type identifier associated with the device access request based upon a correspondence of the destination Internet protocol address and an entry in the local domain name server database.

13. The service provider device of claim 10, wherein the controller is further configured to:
  receive an offload communication from the middlebox identifying a secure communication channel between the client device and the server device; and
  in response to receiving the offload communication, forward a communication instruction to the client device, the communication instruction configured direct the client device to exchange communication with the server device.

14. The service provider device of claim 13, wherein, when receiving the offload communication from the middlebox identifying a secure communication channel between the client device and the server device, the controller is configured to receive an offload communication from the middlebox identifying the establishment of a Transport Layer Security (TLS) connection between the client device and the server device.

15. The service provider device of claim 14, wherein the controller is further configured to validate the TLS connection between the client device and the server device.

16. The service provider device of claim 10, wherein the controller is further configured to:
   receive an offload communication from the middlebox identifying communication between the client device and the server device as meeting a communication volume threshold; and
   in response to receiving the offload communication, forward a communication instruction to the client device, the communication instruction configured to direct the client device to exchange communication with the server device.

17. The service provider device of claim 10, wherein the controller is further configured to:
   receive an offload communication from the middlebox identifying a secure communication channel between the client device and the server device and identifying communication between the client device and the server device as meeting a communication volume threshold; and
   in response to receiving the offload communication, forward a communication instruction to the client device, the communication instruction configured to direct the client device to exchange communication with the server device.

18. The service provider device of claim 10, wherein the controller is configured to:
   detect a client device identifier criterion associated with the device access request;
   compare the client device identifier criterion with a whitelist database; and
   in response to detecting a lack of correspondence between the client device identifier criterion and an entry in the whitelist database, deny communication between the client device and the server device.

\* \* \* \* \*